United States Patent [19]
Socci et al.

[11] Patent Number: 5,829,113
[45] Date of Patent: Nov. 3, 1998

[54] PILE WEATHER STRIPPING INSERTION AND STAKING TOOL

[75] Inventors: Thomas J. Socci, Fairport; Gary F. Reisdorf, Penfield; Ralph P. Remaley, Jr., Rochester, all of N.Y.

[73] Assignee: Schlegel Corporation, Rochester, N.Y.

[21] Appl. No.: 690,222

[22] Filed: Jul. 19, 1996

[51] Int. Cl.$^6$ .................................................. B23P 11/02
[52] U.S. Cl. ................................................ 29/451; 29/235
[58] Field of Search ........................................ 29/235, 451

[56] References Cited

U.S. PATENT DOCUMENTS

| | | |
|---|---|---|
| 3,295,195 | 1/1967 | Burgio, Jr. . |
| 3,798,739 | 3/1974 | Fritz .................................... 29/235 |
| 4,172,313 | 10/1979 | Takahashi ............................ 29/235 |
| 4,471,526 | 9/1984 | Zaltsberg ............................. 29/235 |
| 4,528,736 | 7/1985 | Hope et al. . |
| 4,843,701 | 7/1989 | St. Angelo et al. ................ 29/235 |
| 4,899,429 | 2/1990 | Londono ............................. 29/235 |
| 4,910,821 | 3/1990 | Kieferle .............................. 29/235 |
| 5,018,264 | 5/1991 | Kautt .................................. 29/235 |
| 5,069,739 | 12/1991 | Kautt . |
| 5,103,547 | 4/1992 | Holloway et al. . |
| 5,291,687 | 3/1994 | Abad ................................... 29/235 |
| 5,438,802 | 8/1995 | Johnson . |

*Primary Examiner*—James F. Coan
*Assistant Examiner*—Gene L. Kim
*Attorney, Agent, or Firm*—Cumpston & Shaw

[57] ABSTRACT

A rotatable wheeled tool for simultaneously inserting and staking a weatherstrip into a slot, said tool comprising a body having a channel extending longitudinally from a first end to a second end, said channel configured to accommodate a length of weatherstrip through the body having sides extending a distance beyond the second end to form two legs and a rotatable wheel having an inserting edge and a staking edge, and mounted axially between said the legs with both the inserting and staking edges extending beyond the legs.

22 Claims, 8 Drawing Sheets

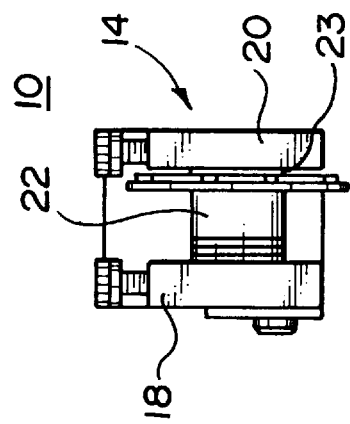
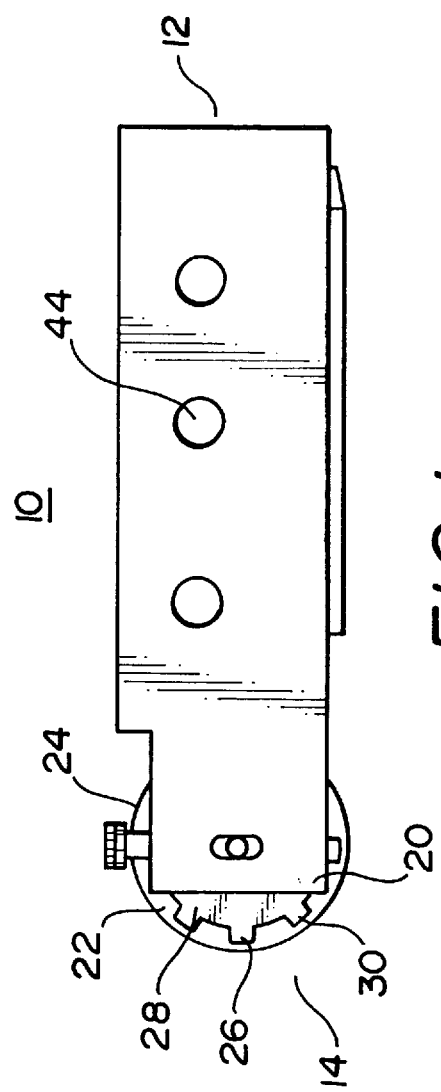
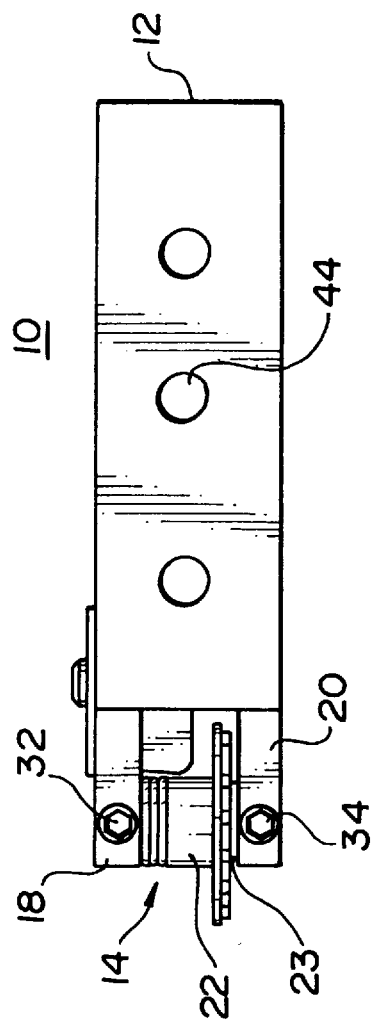

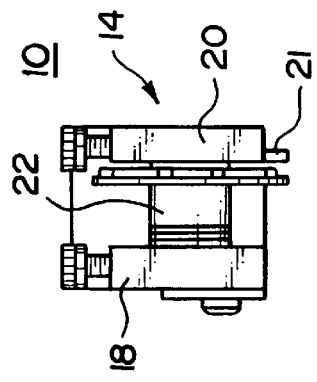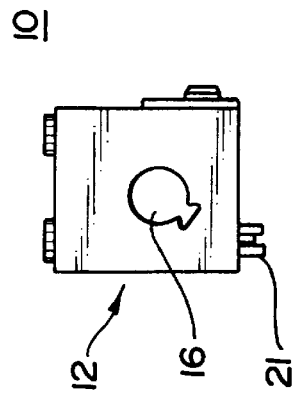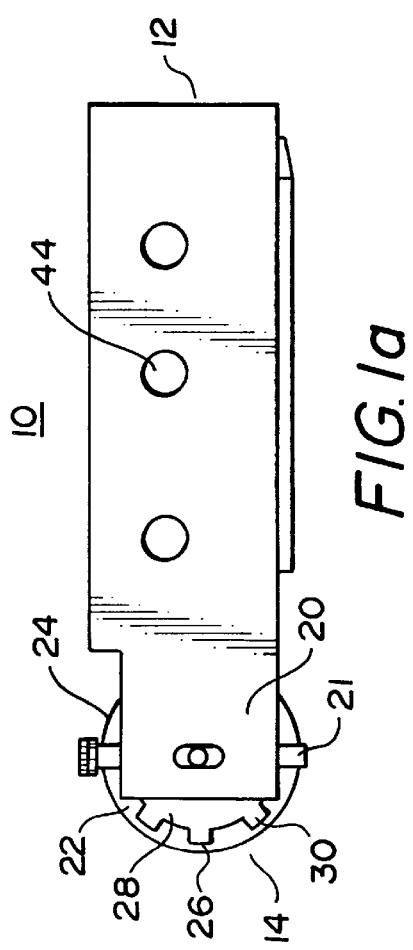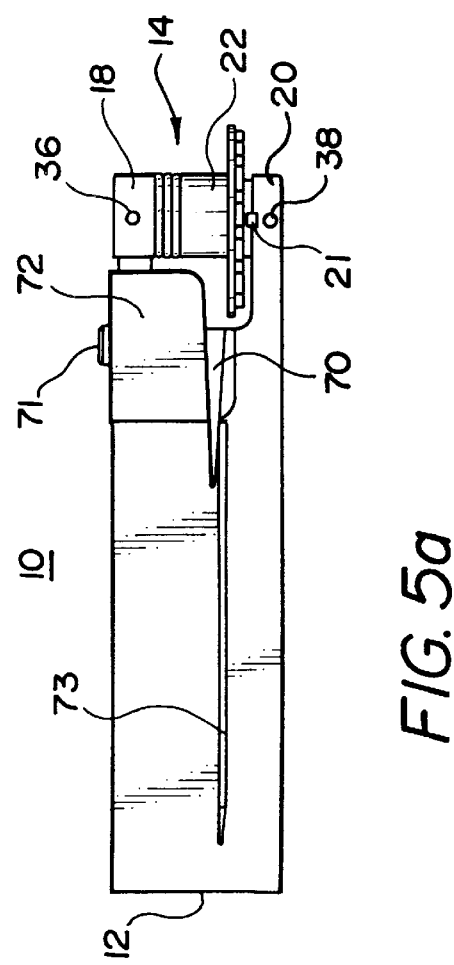

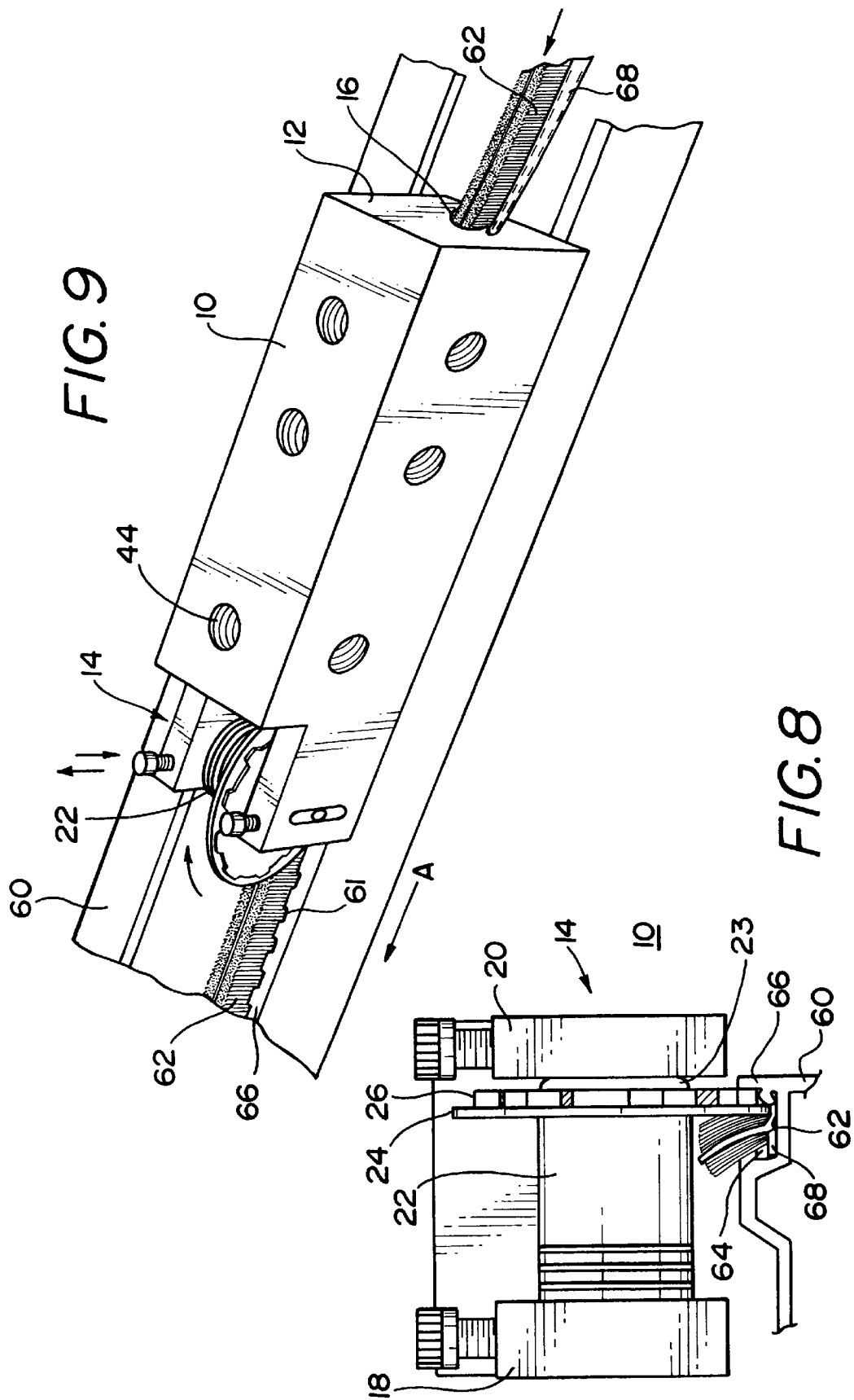

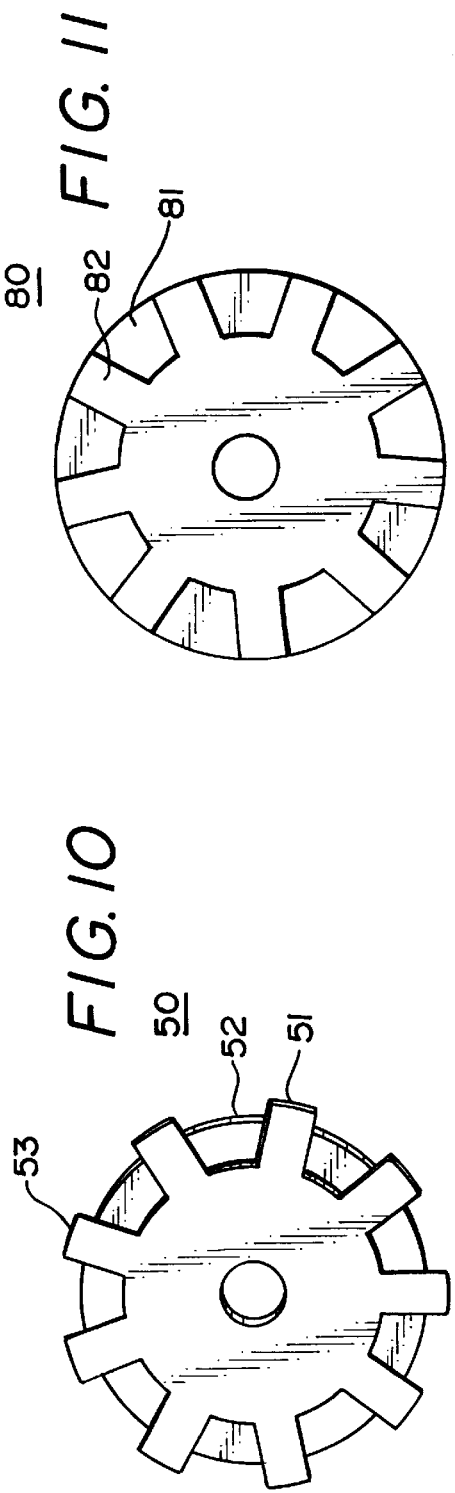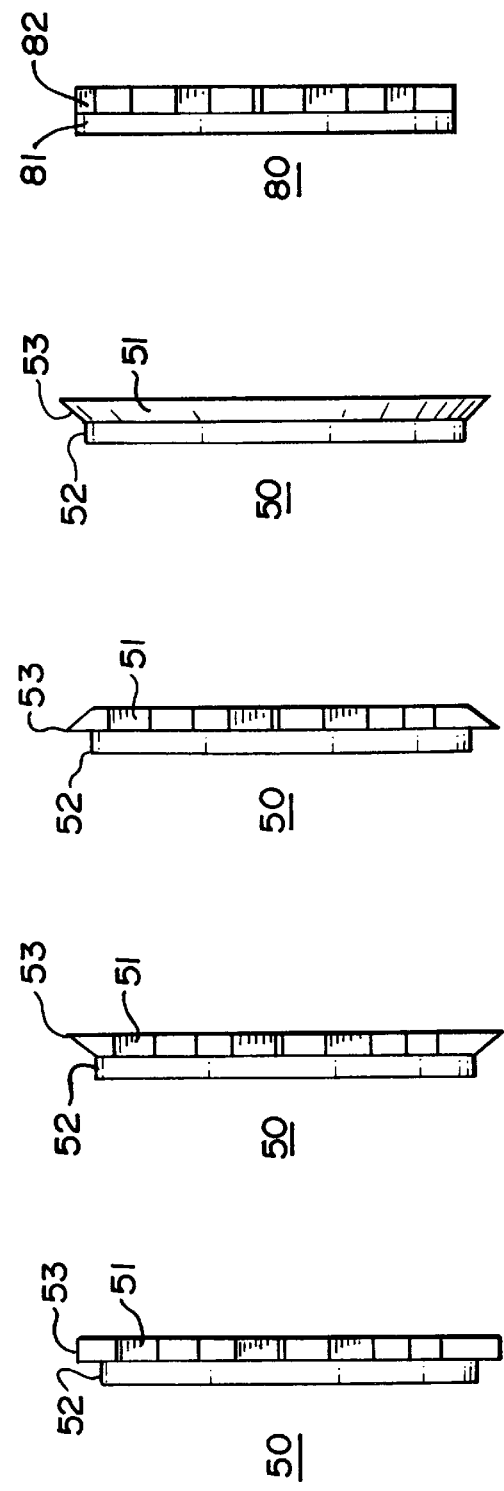

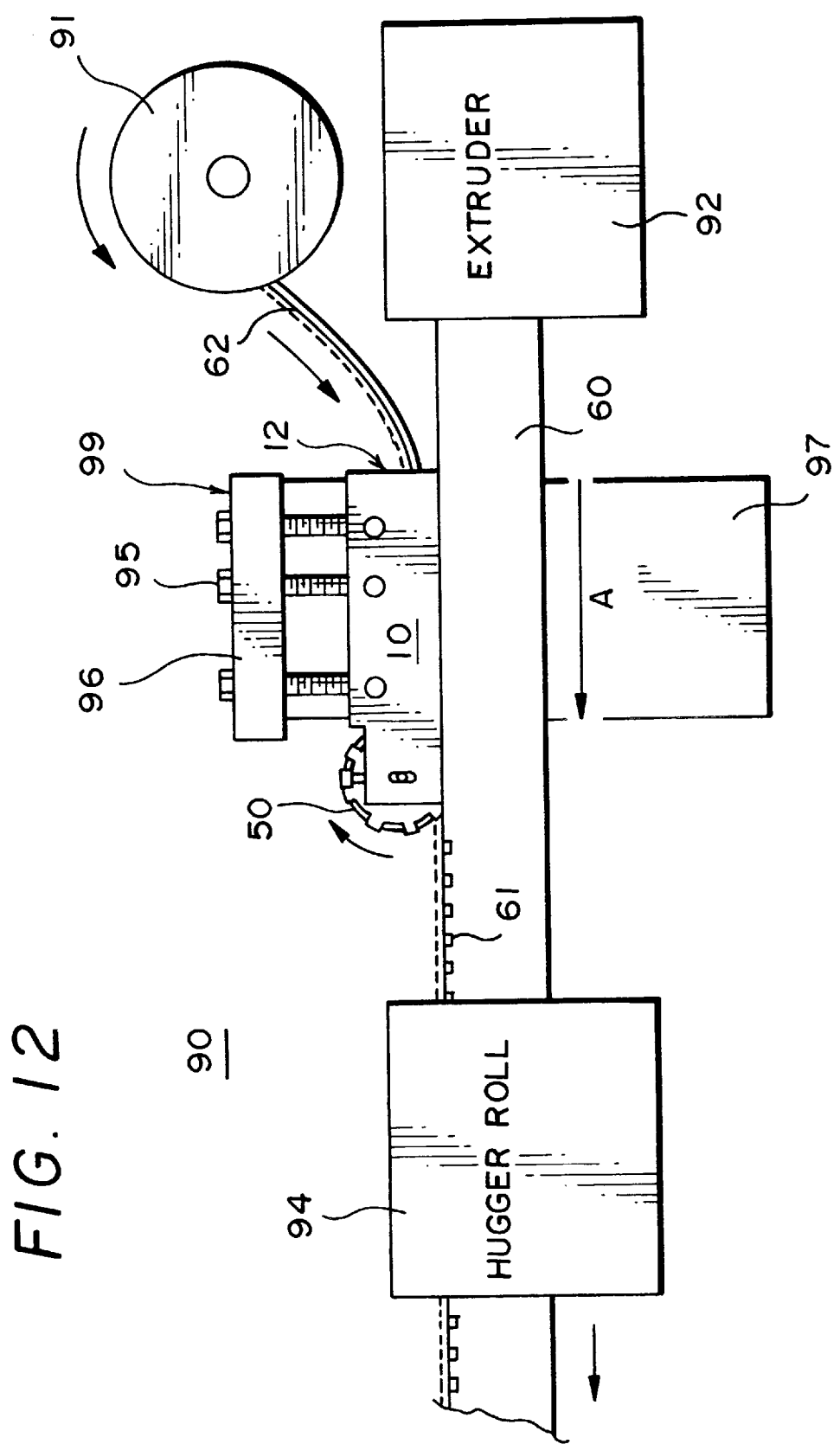

PILE WEATHER STRIPPING INSERTION AND STAKING TOOL

FIELD OF THE INVENTION

The present invention relates generally to weatherstrips, and more particularly, to the insertion of pile weatherstrips, and improved tools and methods for inserting and staking pile weatherstrips into slotted structures.

BACKGROUND OF THE INVENTION

Weatherstrips, particularly pile weatherstrips incorporating an impermeable barrier film or fin within the pile material, have excellent weathering properties. While such weatherstrips are used in various places for various sealing purposes, they are particularly suitable for sealing or weatherstripping the small clearance openings between adjacent wood, aluminum or vinyl materials such as, for example, building materials. Such weatherstrips are particularly useful in door panels or window panels, or between the panels and the frames in which they are mounted, or between the door edge and an adjacent surface such as a floor.

Today, plastics and vinyl materials are increasingly being used as building materials such as, for example, window and door treatments and casings. Vinyl casings are often manufactured by extruding long, continuous lengths which can be cut to length for customized jobs, or cut at regular intervals to make windows and door casings of standard dimensions. Typically, the vinyl lengths are extruded to specifications, and have slots throughout their length ("T-slots" also referred to as "C-slots") into which weatherstrips, preferably pile weatherstrips, are inserted. The pile strip is often backed with a flexible plastic strip serving as the pile base. The configuration of the pile strip can be made to adapt to a slot of any shape. Therefore, for a T-slot, the pile strip is configured into a dimensionally matching T-shape. It is this T-shaped pile weatherstrip which must be inserted into the T-slot of a window or door casing.

Pile weatherstrip insertion has been accomplished in many ways. Pile strips have been pushed or pulled into the T-slot. The strips have also been forced into the T-slots by applying a thin-wheeled roller over the strip which is positioned over the slot. The slotted piece being extruded is then moved forward relative to the roller to drive the strip into the slot. See U.S. Pat. Nos. 5,103,547 and 4,528,736.

To secure the newly slotted strips in the T-slot, the strips are anchored into the slot by compressing sections of the lip of the T-slot against the base of the pile strip. This process is known as staking. A staking wheel is provided at a separate staking station farther downline. The staking wheel is positioned adjacent the slot rim to crimp or pin the T-slot edge into the pile strip. U.S. Pat. No. 3,295,195 shows a device which first inserts and later stakes pile weatherstrip into an aluminum extrusion.

Vinyl extruded window lengths are produced faster and more economically than aluminum counterparts. It would be convenient and economically desirable to insert pile weatherstrip into vinyl window lengths as part of the vinyl extrusion process. Such a process would eliminate the need for a secondary pile strip insertion process into the T-slots. However, practical problems persist.

If the pile strip is inserted on the extruding line without locking in, or staking the pile strip, it will shift within the T-slot during subsequent cutting, handling and shipping. Strips that are not staked risk "drawback" or "shrink-back" after cutting. This refers to the condition weatherstrip no longer extends to provide complete coverage over the entire length of the extruded, slotted material, but "draws back" due to being stretched at the cutting stage due to weak or no staking.

To properly stake the weatherstrip into place, a staking station must be put in place downline from the insertion station. Setting up both an insertion station and a staking station on a vinyl extrusion line is difficult to achieve without adversely affecting the vinyl extrusion rate and product yield. A tool that can accomplish such insertion and staking on the extrusion line without interfering with vinyl extrusion rates would be highly advantageous.

SUMMARY OF THE INVENTION

The present invention provides a tool for inserting and staking a weatherstrip into a slot, for example the T-slot, of extruded materials. The tool has a body having a channel extending longitudinally from a first input end to a second output end. The channel is configured to accommodate and pass a length of weatherstrip through the tool body. The tool body has sides extending a distance beyond the second end to form two spaced legs. The tool further has a rotatable wheel having in combination, both an inserting edge and a staking edge. The wheel is mounted axially between the two legs. Both the inserting and staking edges of the wheel extend beyond said legs.

The present invention further provides a wheel for inserting and staking a weatherstrip into a slot. The wheel comprises both an inserting edge and a staking edge.

The present invention further provides a machine for inserting and staking a weatherstrip into a slotted weatherstrip receiving piece. The machine comprises an extruder for extruding a slotted length of material along a path, a hugger roll assembly, and a weatherstrip tool insertion and staking station comprising a tool positioned adjacent the path for receiving weatherstrip to be inserted into the slotted material. The tool further comprises a body having a channel extending longitudinally from a first input end to a second output end, with the channel configured to accept a length of weatherstrip at the first input end and pass the length of weatherstrip through the body to the second output end. The body has sides extending a distance beyond the second output end to form two spaced legs. A rotatable wheel is having an inserting edge and a staking edge is positioned between the legs. The wheel is positioned such that its circumference extends beyond the legs of the tool body.

Still further, the present invention provides a method for simultaneously inserting and staking a weatherstrip into a slot. A supply of slotted material is provided along with a supply of weatherstrip to a tool. The tool has a body having a channel extending longitudinally from a first input end to a second output end. The channel is configured to accommodate and pass a length of weatherstrip through the body. The body has sides extending a distance beyond the second end to form two legs. A rotatable wheel is rotatably positioned between the two legs. The wheel has an inserting edge and a staking edge. The circumference of the wheel extends beyond said legs. A supply of weatherstrip is then directed through the tool channel to the rotatable wheel. The rotatable wheel and weatherstrip are located adjacent the slotted material. The wheel contacts both the weatherstrip and the slotted material and simultaneously inserts and stakes the weatherstrip into the slot.

BRIEF DESCRIPTION OF THE DRAWINGS

FIG. 1 is a side view of the first side of the tool.

FIG. 1a is a side view showing reciprocating staker feature.

FIG. 2 is an overhead view of the tool.

FIG. 3 is a view of the weatherstrip output end of the tool.

FIG. 3a is an output end view showing reciprocating staker feature.

FIG. 5a is an underside view showing reciprocating staker feature.

FIG. 6a is an input end view showing reciprocating staker feature.

FIG. 8 is a view of the output end of the tool in operation.

FIG. 9 is a perspective elevated view of the tool in operation.

FIG. 10 is an axial view of an alternate embodiment of a staking wheel.

FIGS. 10a–10d show radial views of insertion/staking wheel of FIG. 10.

FIG. 11 shows an axial view of further embodiment of insertion/staking wheel.

FIGS. 11a shows a radial view of the insertion/staking wheel of FIG. 11.

FIG. 12 is a schematic representation of a machine incorporating the tool.

DETAILED DESCRIPTION OF THE INVENTION

Figure 4:
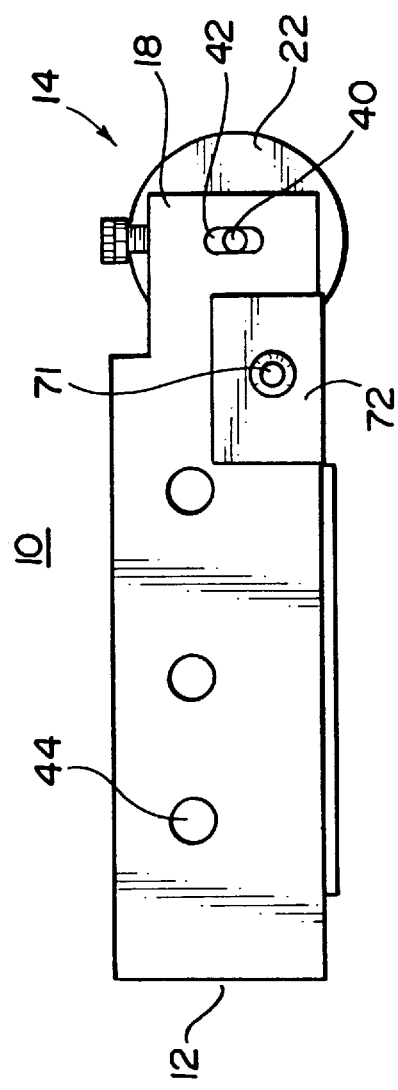
FIG. 4 is a side view of the second side of the tool.
Figure 5:
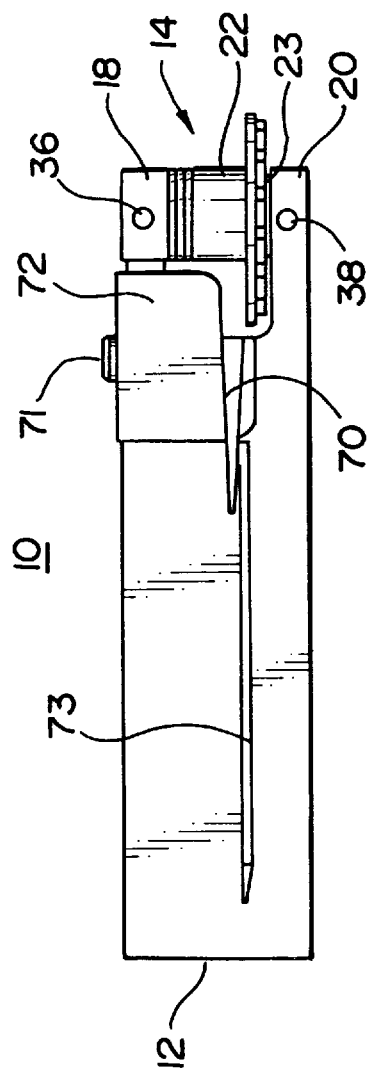
FIG. 5 is an underside view of the tool.

One preferred embodiment of the present invention is shown in FIGS. 1–6. The preferred tool 10 has a weatherstrip input end 12 and an output end 14. Input end 12 has a channel 16 bored through the tool body and extending therethrough to the second end 14. Two legs 18, 20 extend past the output end 14 and are spaced apart a desired distance. A rotatable wheel 22 is positioned between legs 18, 20. The wheel 22 has an inserting edge 24 located about its outer first circumference. As shown in FIG. 1, wheel 22 also has a star-like area 28 with a plurality of projections 30. The outermost edges of the projections 30 form a second circumference of the "star." The second circumference of the wheel 22 comprising projections 30 is referred to as staking wheel edge, or staking edge 26. The top of tool 10 has adjustable set screws 32, 34. Additional set screws 36, 38 are positioned within the underside of the tool body 10, as shown in FIG. 5. Adjustment of the four set screws affects the vertical placement of wheel 22 between legs 18, 20, and affects the distance the wheel circumference may extend below the bottom of the legs. The vertical positioning of wheel 22 and the wheel hub 40 can be viewed through hub guide 42 in the side of legs 18, 20. Screw holes 44 are machined into the tool for joining the tool to a machine which can position the tool as desired. Spacing washer 23 is positioned between wheel 22 and leg 20.

FIG. 5 shows detailed features of a preferred embodiment of the underside of tool 10 to be positioned adjacent the slotted material 60. The channel 16 through tool 10 emerges at narrow opening 70 via fastener 71. Feeder guide 72 is securely positioned relative to opening 70. Tool positioning guide 73 engages the extruded slotted material 60, preferably nesting adjacent T-slot 64, and positions the tool 10 in a desired orientation relative to the slotted material 60. In operation, the feeder guide 72 orients the emerging weatherstrip 62 in a predetermined orientation proximate the slotted material and the wheel 22 to assist in proper weatherstrip insertion into the slot 64.

Figure 6:
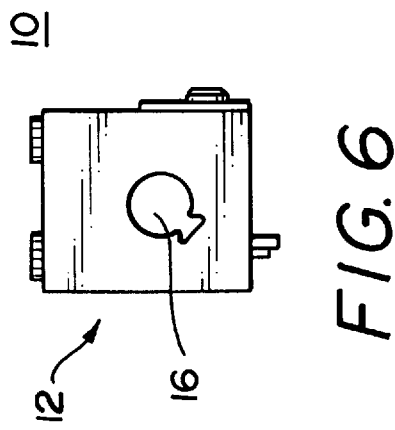
FIG. 6 is a view of the weatherstrip input end of the tool.

FIG. 6 shows the input end 12 of the tool 10 with channel opening 16.

Figure 7:
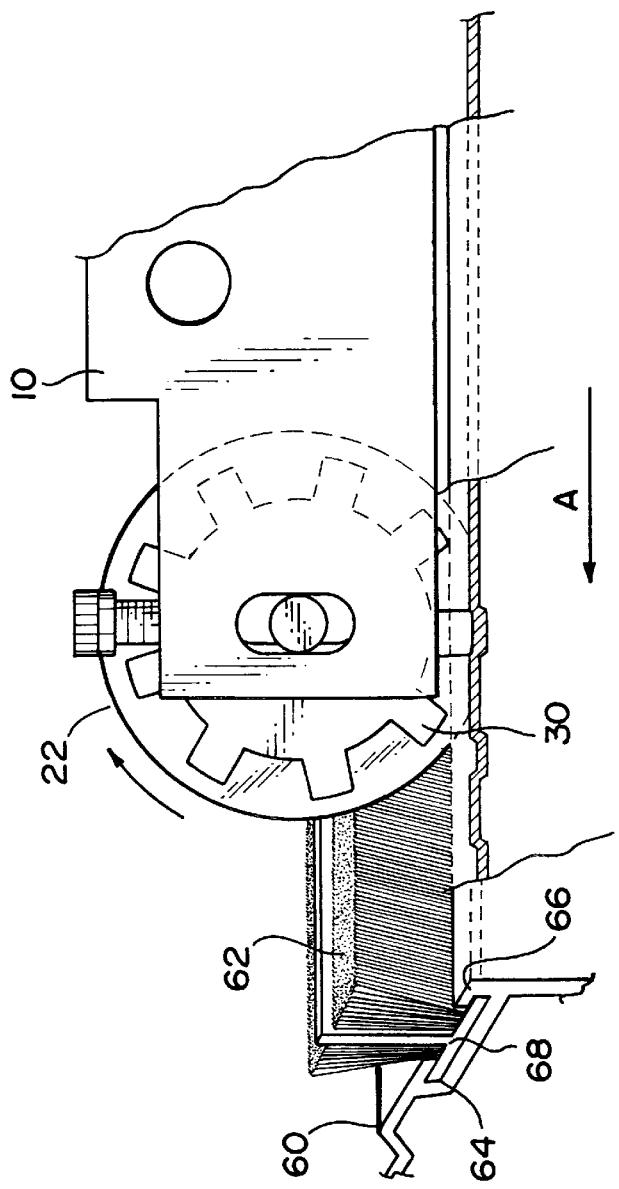
FIG. 7 is a perspective side view of the tool in operation.

FIGS. 7–9 show perspective views of tool 10 adjacent a slotted material 60 that is to receive a segment of pile weatherstrip 62 into its T-slot 64. FIG. 7 shows the pile strip 62 in position, inserted and staked into slot 64 of slotted material 60. Tool 10 receives a length of, preferably continuous pile weatherstrip 62. The weatherstrip 62 has a base 68 and enters the tool 10 at first input end 12 at channel 16, and emerges from the second output end 14 of tool 10 directly over slot 64 of slotted material 60. As slotted material 60 is passed under the stationary tool 10 in the direction of arrow A relative to the tool, weatherstrip 62 first encounters inserting edge 24 of wheel 22 which exerts a downward force on the weatherstrip 62, forcing the base 68 of the strip into T-slot 64. As the wheel 22 rotates, and if sufficient force is present, projections 30 comprising the staking wheel surface 26 engage the slot edge, or rim 66 and deform or crimp the edge downward against the pile base 68, holding or pinning the pile weatherstrip 62 in position within the slot 64.

Figure 7A:
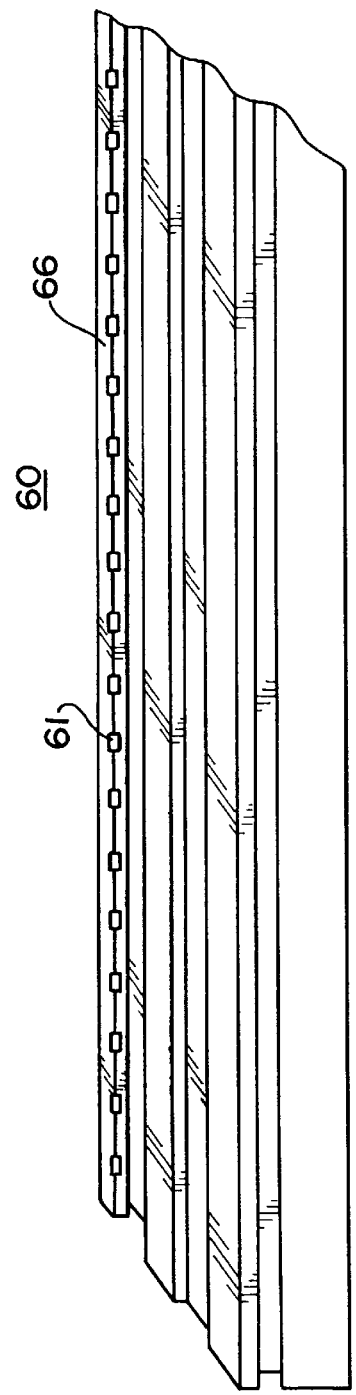
FIG. 7a is a perspective side view of a staked extruded material without the strip in place.

FIG. 7a shows a segment of extruded slotted material 60 which has been staked by the wheel of the present invention. Stake marks 61 are more easily seen in this view where the pile strip has been removed for illustrative purposes only.

FIGs. 1a, 3a, 5a and 6a show an alternate embodiment of the present invention. In this embodiment, the wheel 22 is primarily responsible only for the inserting function. Reciprocating staking element 21 which extends vertically from the tool body intermittently stakes the rim of the weatherstrip. It is understood that the reciprocating staking element is attached to gear mechanisms machined within the tool body. In operation, it is contemplated that the rotational motion of the insertion wheel will provide, through a series of interconnecting gears, sufficient torque and force to drive the reciprocating staking element into the slotted material rim to adequately stake the pile weatherstripping as desired.

FIG. 8 shows a view of the output end 14 of tool 10. The wheel 22 exerts a force on weatherstrip 62 into slot 64 of slotted material 60. Inserting edge 24 and staking edge 26 of wheel 22 are clearly visible. Feeder guide 72 (not shown) presents the strip to the rotatable wheel at a selected angle and assists wheel 22 in orienting weatherstrip into T-slot 64. Slot rim 66 is shown crimped, or staked against pile strip base 68, securing the strip 62 into position within T-slot 64.

FIG. 10 shows an alternate embodiment of the present invention. Wheel 50 has staking wheel projections 51 comprising projection edges 53 and an insertion edge 52. In this embodiment, the outermost edges of the star-like projections occur at the outermost radius and comprise the staking edge. In operation, this wheel is positioned between legs 18, 20 of tool 10.

FIG. 10a shows a radial view of the wheel of FIG. 10. The staking projection 51 comprising projection edges 53 clearly extends beyond insertion edge 52. The projection staking edges as shown are blunt, or are presented at an angle of about 180° across the width of the edge.

FIG. 10b shows a preferred embodiment of the present invention wherein the wheel 50 viewed radially shows the staking projection edge 53, of the projection 51 being angled in the axial direction. The preferred degree of angle is from about 10° to about 80°, preferably from about 20° to about 70°, and is most preferably about 30°.

FIG. 10c shows another embodiment of the present invention. In this radial view of wheel 50, the staking projection edge 53 of the projection 51 angled at about 120°. It is therefore contemplated that the edge of the staking edge projections of the staking wheel can be angled at any degree in either the axial or radial (not shown) direction of from 1° to about 180°, depending only upon the desired aggressiveness of staking to be accomplished, and taking into consideration the extruded material being staked. For vinyl extrusions, it has been experimentally determined that staking is achieved at angles of from about 0° to about 180° preferably from about 10° to about 80° and from about 100° to about 170°, with angles of about 30° and about 120° being particularly preferred.

FIG. 10d shows a further alternate embodiment of the present invention. Wheel 50 comprises an inserting edge 52 and a staking edge 51 having an angled outer edge 53. In this embodiment, the staking edge is a continuous edge in contrast to the intermittent staking edge formed by the plurality of intermittently spaced projections shown in FIGS. 10–10c and 11–11a. In this embodiment, the inserting and staking surfaces are both wheels which may be machined out of one piece, or are separate and affixed together, or are separate but placed proximate to one another, etc.

FIG. 11 shows another preferred embodiment of the present invention with the wheel 80 viewed axially. FIG. 11a shows a radial view of the wheel of FIG. 11. Here, the staking edge formed by the outer edge of projections 82 is coincident with the inserting edge 81. In other words, the outermost circumferences of the projection edges of the staking wheel and the insertion edge of the inserting wheel are about equal.

FIG. 12 shows a machine 90 for inserting and staking weatherstrip into a slotted extruded material. Weatherstrip 62 is fed from a continuous roll 91 to first input end 12 of tool 10. Slotted material 60 is supplied from extruder 92 and pulled from the extruder past staking/inserting station 99 via hugger roll assembly 94 which frictionally engages the extruded material 60 and provides a specific and regulated pulling force on the extruded slotted material 60.

In operation, the extruded slotted material is directed to a hugger roll assembly which grips the material and, through frictional force, draws the material from the extruder at a specified rate past the stationary staking/inserting station 99. The tool 10 is held stationary by the downward force applied to tool 10 by tension screws 95 through clamp 96 supported by stand 97. The downward force is applied to the tool such that the wheel of the tool exerts a predetermined amount of pressure on the slotted extruded material. The pressure can be varied by adjusting the tension screws 95 of clamp 96 upward or downward. The wheel 50 of tool 10 engages weatherstrip 62 as it passes through channel 16 of tool 10, the tool applying force to the strip 62 sufficient to insert the strip into the slot 64 of slotted extruded material 60, while simultaneously staking the strip 62 in the slot 64 by deforming the slot rim 66 against the strip 62 and its base 68 to form stake marks 61.

Figure 12A:
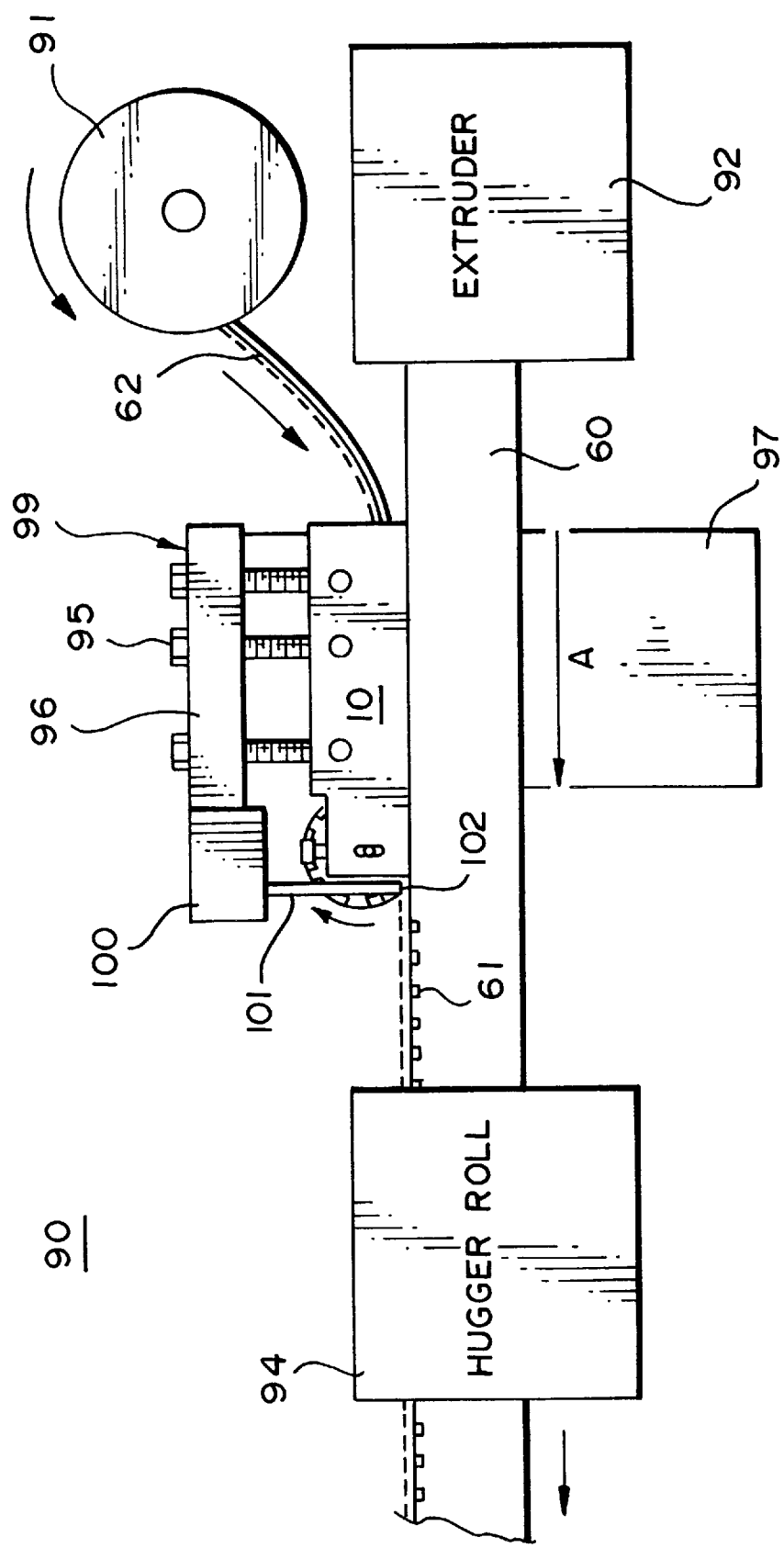
FIG. 12a is a further schematic representation of a machine showing reciprocating staker feature.

FIG. 12a is a schematic representation of an alternate embodiment of the present invention, showing a machine similar to that already described and shown in FIG. 12, except that reciprocating staking element 101 attached to drive gears within housing 100 is responsible for the staking function. The wheel of tool 10 remains responsible for inserting the pile weatherstrip into the T-slot of the slotted extruded material. As the extruded material advances to the hugger roll assembly, in this embodiment, the staking element reciprocates intermittently; alternately rising from and descending into the rim of the slotted material. The staking frequency may be set as desired, as would be readily understood by one skilled in the field of reciprocating machine technology. In this way, the pile strip is inserted and staked simultaneously at one station along the extrusion line. Such an embodiment may be particularly useful for extrusion materials that are especially difficult to stake.

It is understood that the combination inserting/staking wheel of the present invention may be adjustably raised or lowered between the legs of the tool of the present invention, as desired, via adjusting the set screws provided. In operation, the tool engages the slotted material by resting immediately adjacent the slotted material such that the distance of the wheel extending past the bottom of the legs is sufficient to push, or insert the pile weatherstrip into the T-slot. The wheels used with the tool may be adjustably raised, if desired, so that only the inserting edge of the wheel will impact the weatherstrip, and insert the weatherstrip into the slot. However, by setting the wheel lower, so that a greater amount of wheel is visible beneath the legs, and/or increasing pressure on the tool against the slotted material, the staking edge of the wheel will impact the edge or rim of the T-groove immediately after the pile has been inserted into the T-slot. See FIG. 7. In this way, the strip will be simultaneously inserted by the inserting edge of the wheel, and staked by the staking edge of the wheel into the T-slot.

The lateral position of the wheel is also adjustable by use of one or more spacing washers 23 on one or both sides of the wheel 22. This lateral adjustability is a unique feature and especially useful, making the insertion/staking wheel assembly adaptable for use with T-slotted materials having varying wall thicknesses, thus requiring varied positioning of the inserting/staking wheel.

If it is desired to lightly stake the strip (non-permanently) into the slot, the wheel can be so adjusted. If a firm, permanent staking is desired, the wheel may be adjusted to descend lower such that a greater amount of the staking wheel edge will impact and crimp the rim or lip of the T-slot against the pile weatherstrip, thus firmly staking the strip into the slot. Such non-permanent staking is often desirable to afford a manufacturer the opportunity to recycle extruded material. Before recycling can occur, pile stripping must be removed from the extrusion.

In an alternate embodiment of the present invention shown in FIGS. 10–10c, a tool may use a wheel 50 that has a plurality of projections 51 intermittently oriented about the circumference such that the combined surface of the projections form the staking edge. In this embodiment, the staking edge 53 of the wheel 50 would impact the strip and T-slot first; the pile strip simultaneously being inserted and staked with the same wheel surface. The inserting wheel may still impact the pile strip and assist in the strip's proper seating in the T-slot. This wheel would be especially useful when permanent strip staking is desired, but could also be adjusted when only inserting, or inserting and lightly staking the strip is desired.

Therefore, it is understood that combination wheels may be constructed where the staking edge circumference extends past the inserting edge circumference, the inserting edge circumference extends past the staking edge circumference, or the staking and inserting edges are coincident, depending only upon the desired end result. One or both of the inserting and staking edges may be angled if desired. One or both of the wheels may have continuous outer circumferences, or may have intermittent projections. Further, the wheel of the present invention has been described as one wheel having multiple edges or surfaces machined into the wheel. It is to be understood that separate, multiple wheels may be held in close association or affixed together. In this way the inserting and staking edges would occur on different but juxtaposed wheels.

Still further, the channel that extends through the tool may also rotate within the tool to achieve an angular path altering effect on the strip. In this way, the strip may be presented to the wheel at a specified angle, different or the same as the angle it entered the tool at the channel opening.

The present invention further contemplates a tool for simultaneously inserting and staking a weatherstrip into a slot wherein a rotatable wheel or other inserting guide or plate contacts the weatherstrip and inserts the strip into a slot while a staking means simultaneously stakes the strip into the slot. The staking means may be a reciprocating punch, a staking plate applying a constant force to the slot rim so as to crimp the rim, or any other means of crimping the extruded slot material rim so as to stake the strip in place within the slot in temporary, semi-permanent, or permanent fashion as desired.

Temporary staking is understood to mean staking the pile strip into the slot so lightly that the strip may be removed from the slot with minimal force applied to the strip. Semi-permanent staking requires significant force to remove the strip from the slot, but the strip and slotted extruded material may be salvaged or recycled. Permanent staking is understood to mean that the strip cannot be removed from the slot without destroying either or both of the extruded material and/or the strip.

The pattern of projections on the staking wheel is not critical. The staking wheel projections may be of any desired configuration, with blunt, rounded, pointed or angled, etc. ends. The staking wheel edge and inserting edge may also be one continuous surface or may be intermittent, such as by having a plurality of regularly or irregularly spaced projections. If multiple wheels are desired, it is contemplated that one or both wheels may be rotatable or fixed in position.

In the most preferred embodiment, the tool is not self-driven; i.e. no motorization within the tool is responsible for rotating the insertion/staking wheel. However, the combined effect of the pressure exerted on the stationary tool by the clamp, and the frictional force of the wheel against the moving extruded slotted material results in the wheel's rotation. It has been found that the staking and smooth rotational wheel movement is facilitated when more than one staking wheel projection contacts the extruded material at all times.

Many other modifications and variations of the present invention are possible to the skilled practitioner in the field in light of the teachings herein. It is therefore understood that, within the scope of the claims, the present invention can be practiced other than as herein specifically described.

What is claimed is:

1. A tool for inserting and staking a weatherstrip into a slotted material comprising:
   a body having a channel extending longitudinally from a first end to a second end, said channel configured to accommodate and pass a length of weatherstrip through the body, said body having sides extending a distance beyond the second end to form two legs; and
   a rotatable wheel having an inserting surface having an inserting edge as its periphery and a staking surface having a staking edge as its periphery, said wheel mounted axially between said two legs, the staking surface abutting and immovable with respect to the inserting surface; the staking edge defining a continuous periphery with a plurality of intermittent projections spaced apart by inner sections of the staking edge, the inner sections lying within an outer circumference of the inserting edge.

2. The tool according to claim 1, wherein the tool simultaneously inserts and stakes the weatherstrip into the slot.

3. The tool according to claim 1, wherein the inserting edge and staking edge extend beyond said legs.

4. The tool according to claim 1, further comprising a feeder guide to provide the weatherstrip to the rotatable wheel at a selected angle.

5. The tool according to claim 1, wherein the channel directs a length of weatherstrip to the rotatable wheel.

6. The tool according to claim 1, wherein the channel alters the path of the weatherstrip to provide the weatherstrip to the rotatable wheel at a selected angle.

7. The tool according to claim 1, wherein the position of the rotatable wheel is adjustable.

8. The tool according to claim 1, wherein more than one projection contacts the slotted material at any time.

9. The tool according to claim 1, wherein the inserting edge extends beyond the staking edge.

10. The tool according to claim 1, wherein the projections of the staking edge extend beyond the inserting edge.

11. The tool according to claim 1, wherein the inserting edge and the projections of the staking edge have coincident circumferences.

12. The tool according to claim 1, further comprising multiple rotatable wheels.

13. The tool according to claim 1 wherein the plurality of projections are generally rectangularly shaped.

14. The tool according to claim 1 wherein the staking edge is angled in an axial direction of the wheel in one of a range of 10° to 80° and a range of 100° to 170°.

15. A wheel for inserting and staking a weatherstrip into a slotted material comprising a substantially planar inserting surface having an inserting edge as its periphery and a substantially planar staking surface having a staking edge as its periphery, the staking surface abutting and immovable with respect to the inserting surface, the staking edge defining a continuous periphery with a plurality of intermittent projections spaced apart by inner sections of the staking edge, the inner sections lying within an outer circumference of the inserting edge.

16. The wheel according to claim 15, wherein the inserting edge and staking edge simultaneously engage the weatherstrip.

17. The wheel according to claim 15, wherein more than one projection contacts the slotted material at any time.

18. The wheel according to claim 15, wherein the inserting edge extends beyond the staking edge.

19. The wheel according to claim 15, wherein the projections of the staking edge extend beyond the inserting edge.

20. The wheel according to claim 15, wherein the inserting edge and the projections of the staking edge have coincident circumferences.

21. The tool according to claim 15 wherein the plurality of projections are generally rectangularly shaped.

22. The tool according to claim 15 wherein the staking edge is angled in an axial direction of the wheel in one of a range of 10° to 80° and a range of 100° to 170°.

* * * * *